United States Patent [19]

Oughton

[11] 4,211,801
[45] Jul. 8, 1980

[54] PROCESS FOR THE TREATMENT OF COMMINUTED OATS

[75] Inventor: Richard W. Oughton, Odessa, Canada

[73] Assignee: Du Pont of Canada Limited, Montreal, Canada

[21] Appl. No.: 946,716

[22] Filed: Sep. 28, 1978

Related U.S. Application Data

[63] Continuation of Ser. No. 695,206, Jun. 11, 1976, abandoned.

[30] Foreign Application Priority Data

Jun. 17, 1975 [GB] United Kingdom ............... 25804/75

[51] Int. Cl.$^2$ .............................................. A23L 1/36
[52] U.S. Cl. .................................. 426/430; 426/618; 426/622; 426/481; 426/656
[58] Field of Search ............... 426/622, 656, 417, 430, 426/436, 481, 482, 483, 484, 485, 618; 260/412

[56] References Cited

U.S. PATENT DOCUMENTS

| | | | |
|---|---|---|---|
| 2,552,291 | 5/1951 | Rupp | 426/417 |
| 2,554,873 | 5/1951 | Musher | 426/436 X |

FOREIGN PATENT DOCUMENTS 864538 2/1971 Canada .
905909 7/1972 Canada .
905910 7/1972 Canada .

OTHER PUBLICATIONS

Cluskey, J. E. et al., "Oat Protein Concentrates for Beverage Fortification", Jour. Food Sc., 41 (1976) pp. 799–804.
Altschul, A. M. "Processed Plant Protein Foodstuffs", Academic Press, Inc., New York, 1958, p. 45.
D'Appolonia, B. L., "Structure and Comp. of Cereal Non-Starchy Polysaccharides as Related to Their Potential Industrial Utilization", Industrial Uses of Cereal, Symposium Proceedings, Meeting of Amer. Assoc. of Cereal Chem., Nov. 1973.

*Primary Examiner*—Robert A. Yoncoskie

[57] ABSTRACT

A process for the separation of substantially gum-free flour from oats is disclosed. The process comprises admixing comminuted oats with a solvent for oil in the oats and separating substantially gum-free flour from the admixture. In an embodiment the admixture of oats and solvent is separated into two fractions, one being substantially gum-free flour and the other being a bran fraction. Oat oil is recoverable from the solvent. Examples of suitable solvents are pentane, hexane, heptane, cyclohexane and alcohol of 1–4 carbon atoms. The products have a variety of uses in the food industry.

13 Claims, No Drawings

PROCESS FOR THE TREATMENT OF COMMINUTED OATS

This is a continuation, of application Ser. No. 695,206, filed June 11, 1976, now abandoned.

The present invention relates to a process for the treatment of comminuted oats so as to effect the separation of the comminuted oats into fractions of differing composition. In particular, the present invention relates to the treatment of comminuted oats so as to separate the comminuted oats into a so-called "flour" fraction, a so-called "bran" fraction and an oil, and into products derived therefrom, in which the flour is substantially free of gum.

As used herein the expression "groat" refers to the kernel of the oat, the expression "flour" refers to the endosperm of the oat and the expression "bran" refers to the bran of the oat, such bran may have endosperm attached thereto as is exemplified hereinafter. The expression "gum" refers in particular to water-soluble gum.

Oats are a potential source of a wide variety of useful products. Examples of such products are flour, starch, protein isolate, protein-rich flour, bran, gum and oil. Traditional techniques used in the cereal grain processing industry are frequently difficult to use with oats. For example, milling techniques are difficult to use with oats because of process problems relating to the presence of oil in the oats. Moreover, unless the oats are de-oiled prior to milling, such milling techniques would result in the formation of flours and brans containing oil which may result in rancidity problems on storage of the flour and bran.

Gum, together with some protein and starch, may be removed in part by treatment of oats with water, the resultant dilute aqueous solution of gum then requiring treatment prior to disposal or for recovery of the gum. Protein may be extracted from comminuted oats with aqueous solutions, especially alkaline solutions. However any gum present in the oats may also be extracted into solution and the resultant solutions may be viscous and cause process problems, especially in the separation of solids from the aqueous solutions.

The composition and properties of water-soluble gums obtained from cereal grains are discussed by B. L. D'Appolonia in a paper presented at the symposium on "Industrial Uses of Cereals" held in conjunction with the 58th Annual Meeting of the American Association of Cereal Chemists, November 1973.

A process for the separation of acid-soluble protein from comminuted oats, and techniques for the recovery of starch, gum and the like in related processes, is described in Canadian Application No. 245,163 of A. Bell, J. R. B. Boocock and R. W. Oughton, filed Feb. 4, 1976. Techniques for the separation of oil from comminuted oats are known; such techniques are discussed in the aforementioned application of A. Bell et al. A process for isolating protein from a pulverized oil seed using liquid fluorocarbons is disclosed in U.S. Pat. No. 3,869,438 of J. W. Finley et al, which issued Mar. 4, 1975.

Processes for the solvent-extractive milling of maize or corn, wheat, rye and the sorghum grains to remove the bran coat from whole kernels of such grains followed by comminution of the whole milled kernels and for separation of fibrous, proteinaceous, endosperm and/or starch fractions derived from such grains are disclosed by T. B. Wayne in Canadian Pat. Nos. 864,538, which issued Feb. 23, 1971, and 905,909 and 905,910, both of which issued July 25, 1972.

A need exists for the discovery of a process for the treatment of comminuted oats, especially for the production of flour and/or protein, that is less susceptible to process problems relating to the presence of oil and gum in the oats.

A process for the separation of a flour fraction a bran fraction and oil from comminuted oats in which gum does not cause significant process problems and in which the flour is essentially free of gum has now been found.

Accordingly, the present invention provides a process for the separation of a substantially gum-free flour from oats, said process comprising:

(a) admixing comminuted oats with an organic solvent, said solvent being capable of extracting oat oil from said oats, and (b) separating substantially gum-free flour from the admixture of comminuted oats and solvent, the amount of flour separated from the admixture being at least 20% by weight of the comminuted oats.

In a preferred embodiment of the process of the present invention the oats are comminuted dehulled oats.

In another embodiment the comminuted oats and solvent are admixed under controlled conditions, said controlled conditions being adapted to cause non-uniform distribution of the comminuted oats in the solvent.

In yet another embodiment of the controlled conditions include the cessation of mixing immediately prior to separating the first fraction from the second fraction.

In a further embodiment the solvent and comminuted oats are mixed continuously and under the controlled conditions.

In a still further embodiment solvent is continuously added to the comminuted oats and the gum-free flour is continuously separated from the admixture of comminuted oats and solvent.

The comminuted oats used in the process of the present invention are preferably dehulled oats. Techniques for dehulling oats are known in the art. The dehulled oats, herein frequently referred to as groat, are comminuted in order to facilitate extraction of oil and to facilitate separation of the comminuted groat so obtained into a flour fraction and a bran fraction. Conventional comminuting techniques, for example, pinmilling, hammer milling, corrugated rollers and other shearing techniques, would appear to produce an acceptable comminuted groat. Suitable sizes are exemplified in the examples hereinafter.

The comminuted groat is added to a solvent for the oil in the oats. The solvents used should be acceptable for use with food, e.g., be non-toxic at the levels remaining in the products produced, not cause the formation of toxic materials in the product and not have a significant deleterious effect on the nutritional value of the product, and must be capable of causing separation of the flour and bran fractions. The amount and type of solvent remaining in products offered for sale must be acceptable to the appropriate health authorities, as will be understood by those skilled in the art. Examples of solvents are pentane, hexane, heptane, cyclohexane and alcohols of 1–4 carbon atoms, and mixtures thereof; as used herein the solvents hexane and heptane include those solvents referred to in the food industry as hexane and heptane. The preferred solvent is hexane. The present invention will generally be described hereinafter with reference to hexane as the solvent and to the separation of substantially gum-free flour from comminuted groat.

Before accepting the comminuted groat into flour and bran fractions it may be desirable to thoroughly mix the solvent, hexane, and comminuted groat for a period of time so as to facilitate extraction of the oil from the comminuted groat, i.e. to de-oil the comminuted groat. Such mixing is preferably carried out with agitation, e.g., by forming a slurry of the comminuted groat and hexane.

According to the present invention there are a number of techniques for separating the flour fraction from the bran fraction. In an embodiment of a so-called batch process the comminuted groat and hexane are thoroughly mixed for a period of time so as to extract oil from the comminuted groat. The mixing may then be adjusted to effect separation of the mixture of comminuted groat and hexane into a flour fraction and a bran fraction, as is discussed in more detail hereinafter, or the mixing may be discontinued. If mixing is discontinued, the bran fraction tends to settle relatively rapidly, thereby allowing the flour fraction to be separated from the bran fraction of the admixture. The flour fraction should be separated as soon as practical after cessation of mixing as the flour in the flour fraction also tends to settle thereby making separation from the bran fraction less efficient and/or more difficult. In the embodiment of the process involving the cessation of mixing it is preferable to repeat the above sequence of steps one or more times e.g., by adding hexane each time and re-mixing, in order to effect a high degree of separation of the comminuted groat into flour and bran. Alternatively the admixture of comminuted groat and hexane may be separated into fractions by sieving the admixture. The mesh size of the sieve selected will depend primarily on the degree of separation desired. Preferably a sieve having a fine mesh e.g., 300 or finer, is used, the use of a 325 mesh TYLER TM sieve being exemplified hereinafter. The bran fraction, which as exemplified is retained on the sieve, may be used as such or subjected to further comminution as described hereinafter. Preferably the mesh size of the sieve is such that the solid component of the flour fraction, which passes through the sieve, is white and essentially free of bran.

In another embodiment, in particular when the process is operated as a so-called continuous process, separation of the admixture of comminuted groat and hexane may be effected by careful control of the mixing of the comminuted groat and hexane, especially immediately prior to and during separation of the flour and bran fractions. Such control of the mixing is essential to cause a non-uniform distribution of comminuted groat in the hexane and separation of the comminuted groat into fractions. If the mixing is too efficient a "uniform" mixture of comminuted groat and hexane will be obtained and separation of the comminuted groat into the flour and bran fractions will not occur in situ. Separation may, however, be effected by removing a portion of the mixture of comminuted groat and hexane, separating e.g. by using a sieve, the flour fraction and recycling the bran fraction. If the mixing is insufficient the distribution of comminuted groat in the hexane will be non-uniform and the comminuted groat tends not to separate into fractions unless periods of insufficient mixing are interspersed with periods in which there is a higher degree of mixing.

Intermediate between the states of uniform mixing and of insufficient mixing described above, the mixing is capable of being controlled so as to produce continuously a non-uniform distribution of comminuted groat in the hexane and in particular to produce two fractions of comminuted groat in the hexane. The first fraction, usually the upper fraction, is comprised of flour as the major solid component. The second fraction, usually the lower fraction, is comprised of bran as a major component. As exemplified hereinafter the mixing may be controlled so that the two fractions are distinct, except near the interface between the two fractions, in terms of colour and general appearance. The two fractions are capable of being separated from each other. One separation technique relies on partial separation of the flour fraction, followed by addition of hexane to the fractions remaining and to subsequently effect further separation of a flour fraction from the bran fraction, as described hereinabove with reference to the embodiment involving the discontinuation of mixing. A preferred separation technique comprises continuously adding hexane to the mixture of hexane and comminuted groat and at the same time removing hexane and part of, in particular, the flour fraction. Using the latter separation technique any flour suspended in the bran fraction is capable of being separated. It may be desirable to sieve the flour fraction as it is being separated from the bran fraction, or thereafter, and to return any oversize particles to the bran fraction for further treatment. The bran fraction may also be separated. The bran fraction separated in the process of the present invention may be comprised of bran particles having endosperm adhered thereto. The bran fraction, after separation from any hexane, may be subjected to further comminution and either returned to the admixture of comminuted oats and hexane for further separation into flour and bran fractions or separately admixed with hexane and separated into further flour and bran fractions. Bran fractions of varying endosperm content are obtainable.

The flour may be separated from the flour fraction by known techniques for separating a solid from a solution. For example, the flour may be separated from the flour fraction by centrifuging techniques. As the hexane contains dissolved oil, it may be desirable to wash the flour after separation so as to remove any oil adsorbed on the flour. The oil may be recovered from the oil-containing hexane solution by removal of the hexane. Similarly, bran may be recovered from the bran fraction by removal of any hexane in the fraction. In these operations the hexane is preferably recovered and re-used in the separation of the flour and bran fractions from the comminuted groat. Alternatively, the oil-containing hexane solution may at least in part be used in the separation of the flour and bran fractions from the comminuted groat.

While the separation of the flour and bran fractions has been generally described above as a one step process, the process may be operated, possibly more efficiently, as a multistep process, e.g., the flour and bran may be separated in a series of process operations. Such a method may result in the separation of flour fractions containing flour of varying protein contents and of bran fractions having varying properties. Such may be advantageous for some end uses.

The oil obtained in the process of the present invention may be turbid and it may be desirable to clarify the oil. The oil may be clarified by techniques known in the art or by mixing with isopropanol especially isopropanol containing hydrogen peroxide, agitating and then removing any solid material, e.g., by centrifuging. As is exemplified hereinafter a clear brown oil is obtainable. The solids removed on centrifuging are believed to contain significant amounts of phospholipids and may be suitable for use, for example, as emulsifiers.

The flour that is separated by the process of the present invention is essentially free of gum. In addition the flour is essentially free of oil. The gum and oil content of the flour is exemplified hereinafter. The water-soluble gums, which are in the bran fraction, are recoverable. The products of the process of the present invention are believed to be useful in the food industry either as such or as a source of other products.

The major components of the flour are starch and protein. The flour is capable of being separated into fractions of varying starch and protein contents using air classification techniques. Protein and starch concentrates may be obtained from the flour by extracting the flour with aqueous acidic or alkaline solutions. As is exemplified hereinafter a high proportion of the protein in the flour may be extracted by forming a slurry of the flour in such aqueous solutions. The pH of the aqueous solution is preferably at least 9.0 and especially about 11.0 if the solution is alkaline and about 2.0 if the solution is acidic. Examples of suitable alkalis for the adjustment of pH are sodium hydroxide and potassium hydroxide. Examples of suitable acids are phosphoric acid, hydrochloric acid and citric acid. As discussed and exemplified herein gums especially water-soluble gums in the oat are separated in the bran fraction in the process described above and the flour obtained is essentially free of gum. Thus processes for the extraction of protein from the flour of the process of the present invention may be operated at low solution viscosities, which is most advantageous from a processing and especially a product separation point of view. The solid material in the protein extraction solution may be separated from the solution using, for example, centrifuging techniques. It may be desirable to wash or re-slurry the solids with water to separate adsorbed solubilized protein and to re-separate the solids. The solid material is comprised primarily of starch. If the starch contains a minor amount of bran or the like it may be desirable to subject it to, for example, sieving, washing or air classification to purify the starch.

The solubilized protein may be recovered by, for example, isoelectric precipitation. The pH of the solubilized protein solution is adjusted to about 3.5–4.5 with alkali, e.g., sodium hydroxide, or acid, e.g., phosphoric acid, as required. The precipitate of protein obtained may be separated by, for example, centrifuging the solution. Protein may also be obtained by freeze drying the solution of solubilized protein. This may be especially useful for recovery of acid-soluble protein especially from solutions at the pH at which it is desired that the protein be soluble. The properties of the protein, including the colour of the protein may depend on the technique of extracting and separating the protein. Protein obtained by alkali or acid extraction is believed to be stable in hot aqueous acidic solutions. Acid-soluble protein obtainable from flour, as described herein, may be preferable to that obtainable directly from de-oiled groat. If the protein is to be blended with another substance, e.g., flour, it may be preferable to extract the protein from the flour with an acidic solution and freeze dry the protein as the protein so obtained may be whiter than that obtained by isoelectric precipitation.

Protein may also be extracted from the flour using aqueous solutions of substantially neutral pH. Such protein is capable of being precipitated in hot water.

The products obtained in the process described herein are believed to be commercially viable products. The bran fraction, with or without added protein, may be used, for example, in breakfast cereals or as a filler for meat products or pet foods. The flour is capable of being used as such or when enriched with protein, for example, in breakfast cereals, baby foods and cake flour. The gum is capable of being extracted from the bran with, for example, hot water and recovered for use as a binder or thickener in the food industry. The oil is capable of being used as, for example, a vegetable oil.

The present invention is illustrated by the following examples:

EXAMPLE I

Dehulled Hinoat oats, obtained from Agriculture Canada, Ottawa, Ontario, were ground (comminuted) in a CASELLA TM grain mill having a 2.5 mm diameter circular hole sieve. 250 g of the resultant ground groat were placed in a vertical cylinder having a diameter of 6.3 cm and a height of 40.6 cm. 600 ml of hexane were added to the cylinder and the resultant mixture was maintained as a slurry, using an agitator, for 20 minutes at ambient temperature. Agitation was then stopped and the upper bran-free layer was siphoned off. The procedure was repeated four times with 500 ml of hexane being added each time. The bran layer was then centrifuged to separate hexane and the bran fraction was dried under vacuum at room temperature and weighed.

The hexane fractions were passed through a 325 TYLER mesh sieve and oversize particles were added to the bran fraction. Flour was then centrifuged from the hexane solution. Oil was obtained from the resultant hexane solution by evaporating the hexane.

The centrifuged flour was admixed, as a slurry, with hexane to remove any adsorbed oil and re-centrifuged. The flour was then dried under vacuum. The white flour obtained was very bland to taste.

The bran obtained above was reground in the CASELLA grain mill using a 0.5 mm diameter circular hole sieve. 112 g of the reground bran were treated three times with hexane using the procedure described above for ground groat. The bran and flour fractions so obtained were dried. A 55 g sample of this bran fraction was wet ground in hexane in a puck mill and retreated with hexane. The resultant bran and flour fractions were dried.

The results were as follows: (all percentages by weight).

| Sample | Weight (g) | Product Extracted (%)** | Protein Content(%)* | Moisture Content(%) |
| --- | --- | --- | --- | --- |
| Ground groat | | | 20.5 | 9.84 |
| First Separation (250 g of ground groat treated) | | | | |
| Flour | 89.6 | 35.8 | 20.5 | 9.38 |
| Oil | 12.3 | 4.9 | | |
| Bran | 149.5 | 59.8 | 22.3 | 8.46 |
| Second Separation (112 g of reground bran treated) | | | | |
| Flour | 28.7 | 25.6 | 19.6 | 12.29 |
| Bran | 82.9 | 74.0 | | 7.31 |
| Third Separation (55 g of puck milled bran treated) | | | | |
| Flour | 5.1 | 9.3 | 29.9 | 14.84 |

| Sample | Weight (g) | Product Extracted (%)** | Protein Content(%)* | Moisture Content(%) |
|---|---|---|---|---|
| Bran | 49.6 | 90.2 | | |

*based on Kjeldahl analysis for nitrogen times 6.25
**percentages are based on weight of material treated This examples shows that the protein content of the flour is capable of being varied.

EXAMPLE II

A sample of dehulled Hinoat oat was pinmilled using an Alpine CONTRAPLEX ™ 250 CW pinmill. It is believed, based on data from the pinmilling of wheat, that 90% of the resultant comminuted groat would pass through a 325 mesh TYLER sieve. 200 g of the comminuted groat were placed in a column that was 38.1 cm high, 6.3 cm in diameter and adapted so that hexane could be fed to the bottom of the column and removed, by means of an overflow, near the top of the column. The column was equipped with a stirrer, the blades of which were near the bottom of the column. Over a period of about two hours 2000 ml of hexane was passed through the column. During this period the stirrer was adjusted so that a separation of the comminuted groat/hexane mixture into a flour fraction and a bran fraction occurred approximately 7.7 cm below the overflow.

The bran was separated from the hexane in the column and dried under vacuum. The flour, which passed with the hexane through the overflow, was centrifuged from the hexane and dried. Oil was separated from the hexane.

The results were as follows:

| Sample | Weight (g) | Product Extracted (%) | Protein Content (%) |
|---|---|---|---|
| Comminuted Groat | 200 | | 23.9 |
| Flour | 128.0 | 64.0 | 28.75 |
| Bran | 62.7 | 31.4 | 20.65 |
| Oil | 12.8 | 6.4 | |

EXAMPLE III

A sample of dehulled Hinoat oat was ground in a CASELLA grain mill using a 2.5 mm diameter circular hole sieve. The resultant ground groat was placed in the cylinder of Example II and slurried with 600 ml of cyclohexane for 30 minutes at ambient temperature. The stirrer was then stopped and the bran-free upper layer was siphoned off. This procedure was repeated three times with 500 ml of cyclohexane being added each time.

The flour fraction, from the bran-free upper layer, was poured through a 325 mesh TYLER sieve; oversize particles were added to the bran fraction. Bran, flour and oil were separated and dried using the procedures described above.

The results were as follows:

| Sample | Weight (g) | Product Extracted (%) | Protein Content (%) | Moisture Content (%) |
|---|---|---|---|---|
| Ground groat | 250 | | 20.5 | 9.8 |
| Flour | 73.4 | 29.4 | 17.4 | 5.2 |
| Bran | 145.7 | 58.3 | 23.9 | 6.5 |
| Oil | 14.5 | 5.8 | | |

EXAMPLE IV

The procedure of Example III was repeated using methanol, instead of cyclohexane, as solvent. The results were as follows:

| Sample | Weight (g) | Product Extracted (%) | Protein Content (%) | Moisture Content (%) |
|---|---|---|---|---|
| Ground Groat | 250 | | 20.5 | 9.8 |
| Flour | 74.5 | 29.8 | 19.0 | 9.4 |
| Bran | 145.1 | 58.1 | 25.6 | 4.1 |
| Oil | 11.1 | 4.4 | | |

The flour obtained was very white, odour-free and bland to taste.

EXAMPLE V

A sample of dehulled Hinoat oat was ground in a CASELLA grain mill using a 2.5 mm diameter circular hole sieve. 500 g of the ground groat were admixed with 1000 ml of hexane in a 2000 ml beaker. The resultant mixture was admixed, using a mechanical stirrer, as a slurry for 30 minutes at ambient temperature. The stirrer speed was decreased so as to cause separation of the mixture into a flour fraction and a bran fraction, and the flour fraction was siphoned off through a 325 mesh TYLER sieve; oversize matter was returned to the beaker. The procedure was repeated four times with 1000 ml of hexane being added each time. The flour was separated from the siphoned-off solution using a centrifuge and dried. 118.1 g of white flour containing 20.3% protein and bland to taste was obtained.

20 g samples of the flour were admixed as a slurry, for 30 minutes with 100 ml of distilled water. The pH of the water was adjusted to 11.0, 9.0, 2.6 or 1.5 using either sodium hydroxide or phosphoric acid, as appropriate. The slurry was then centrifuged. The supernatant liquid was removed and the solid material admixed as a slurry for 30 minutes with 100 ml of water to separate adsorbed protein and re-centrifuged. The solids (mainly starch) were dried. The supernatant liquid was combined with that obtained previously and the pH of the resultant solution was adjusted to 4.5 with either sodium hydroxide or phosphoric acid. The protein, which precipitated, was centrifuged from the solution and dried under vacuum The results were as follows:

| Solution pH | Starch (g) | Protein in Starch (%) | Protein Fraction (g) | Protein Content of Protein Fraction (%) |
|---|---|---|---|---|
| 11.0 | 15.60 | 0.93 | 4.10 | 89.5 |
| 9.0 | 15.67 | 7.4 | 2.74 | 88.4 |
| 2.6 | 14.48 | 3.2 | 3.30 | 90.8 |
| 1.5 | 14.60 | 1.7 | 4.16 | 88.7 |

All protein fractions were white but that extracted with the acid solution was whiter than that obtained using the alkali solution.

EXAMPLE VI

The dried bran fraction of Example V was milled in an experimental wheat mill equipped with breaker and reduction rolls and sifters and designed to simulate a commercial wheat milling operation. Four fractions viz bran, coarse shorts, fine shorts and flour were obtained. No process problems were observed in the milling. The flour obtained was white and bland to taste.

The results, reported on a dry matter basis, were as follows:

| Sample | Fraction of Bran (%) | Protein (%) | Oil (%) | Crude Fiber (%) | Ash (%) |
| --- | --- | --- | --- | --- | --- |
| Bran | 19.4 | 30.2 | 1.60 | 3.32 | 3.92 |
| Coarse Shorts | 30.6 | 31.1 | 3.01 | 2.85 | 4.15 |
| Fine Shorts | 9.5 | 24.6 | 2.28 | 2.44 | 3.02 |
| Flour | 19.8 | 15.4 | 1.07 | 0.70 | 1.23 |
| Flour* | — | 24.5 | 0.48 | 0.43 | 1.12 |

*for comparison, the results are for the flour of Example V.

EXAMPLE VII 174.3 g of oil, which was turbid and green, obtained by the extraction of Hinoat oat with hexane was mixed with 500 ml of 2-propanol for 15 minutes. The resultant solution was centrifuged and the clear brown upper layer was decanted. The 2-propanol was removed using a rotary evaporator. The oil (125.5 g) obtained was clear and brown.

EXAMPLE VIII

To show the distribution of water-soluble gums in the products of Example II, 20 g of each of ground groat, flour and bran were admixed, as a slurry, with 80 ml of distilled water at 25° C. The viscosity of the solution was then determined using a BROOKFIELD TM model LVF #1 spindle at 60 rpm. The results were as follows:

| Sample | Viscosity (cps)**** |
| --- | --- |
| Ground Groat | 400 |
| Flour | 8 |
| Bran | ** |
| Water*** | 2.5 |

**could not be determined, solution was like paste
***reference, water only
****as indicated on viscometer

EXAMPLE IX

Dehulled oats were ground in a CASELLA grain mill having a 2.5 mm diameter circular hole sieve and then reground in the mill using a 1 mm sieve. 250 g of the resultant ground groat were placed in a vertical cylinder having a diameter of 6.3 cm and a height of 40.6 cm. 600 ml of hexane were added to the cylinder and the resultant mixture was admixed, as a slurry, using an agitator, for 30 minutes at ambient temperature. The speed of the agitator was then adjusted so as to cause separation of the slurry into a flour fraction and a bran fraction. The flour fraction was siphoned off. The extraction procedure was repeated four times, 500 ml of hexane being added each time.

Bran was recovered from the bran fraction and dried. Flour was centrifuged from the flour fractions, re-admixed, as a slurry with 500 ml of hexane, separated from the hexane solution by centrifuging and dried. Oil was recovered from the hexane solutions.

The oil contents of the ground groat, flour and bran were determined by soxhlet extraction using hot hexane.

The results were as follows:

| Sample | Product Extracted (%) | Oil Content (%) |
| --- | --- | --- |
| Ground Groat | — | 5.6 |
| Flour | 43.0 | 0.08 |
| Oil | 6.1 | — |
| Bran | 47.4 | 0.89 |

EXAMPLE X

Dehulled Hinoat oats (groat) were comminuted in a commercial hammer mill. 200 g of the comminuted oats were admixed in the form of a slurry for 30 minutes with 400 g of n-heptane (b.p. 97°-98° C.) and then sieved using a 325 mesh TYLER sieve. The oversize material i.e. that retained on the sieve, was re-admixed with 400 g of n-heptane in the form of a slurry for 30 minutes and then re-sieved. Once again the oversize material obtained was admixed, as a slurry, with 400 g of n-heptane for 30 minutes and re-sieved. The oversized material thus obtained, referred to below as bran, was dried overnight in a vacuum oven. The bran was buff coloured.

The undersized material, i.e. that passing through the sieve, from each of the sievings was combined and then centrifuged. The solution of n-heptane and oil was decanted off. The solid material from the centrifuge was admixed with 200 g of n-heptane in the form of a slurry so as to remove any adsorbed oil and re-centrifuged, the n-heptane solution again being decanted off. The oil was separated from the n-heptane from the combined n-heptane/oil solutions using a rotary evaporator and dried overnight in a vacuum oven. The oil was green and turbid.

The solid material from the centrifuge, referred to below as flour, was dried overnight in a vacuum oven. The flour was white in colour.

The protein content was measured as in Example I. The results were as follows:

| | Weight (g) | Percentage of Groat | Protein Content (%) |
| --- | --- | --- | --- |
| Groat | 200 | | 19.4 |
| Oil | 15.1 | 7.6 | — |
| Flour | 102.2 | 51.1 | 18.6 |
| Bran | 68.8 | 34.4 | 23.2 |
| Recovery | | 93.1 | |

EXAMPLE XI

Dehulled Hinoat oats (groat) were comminuted using a BEUHLER TM laboratory scale corrugated roller mill. The fractions obtained from the mill were combined and were shown to have the following particle size distribution.

| Particle Size (TYLER mesh) | Percentage by Weight |
| --- | --- |
| +10 | 5.0 |
| +12 | 7.2 |
| +16 | 18.0 |

| Particle Size (TYLER mesh) | Percentage by Weight |
|---|---|
| +20 | 16.1 |
| +25 | 10.2 |
| −25 | 43.5 |

242.4 g of the above comminuted groat were admixed with 484.8 g of hexane, in the form of a slurry, for 30 minutes. The slurry was then sieved through a 325 mesh TYLER sieve. The oversized material i.e. that retained on the sieve, was re-admixed with a further 484.8 g of hexane, as a slurry, for 30 minutes and re-sieved. The resultant oversized material was once again re-admixed with 484.8 g of hexane, in the form of a slurry, for 30 minutes and re-sieved. The oversized material thus obtained, referred to hereinbelow as bran, was washed with 200 ml of hexane and then dried overnight in a vacuum oven. The bran so obtained was buff coloured.

The undersized material, i.e. that passing through the sieve, from all of the above sievings was combined and centrifuged. The solid material from the centrifuge, referred to below as flour, was admixed with 200 ml of hexane, in the form of a slurry, so as to remove any adsorbed oil, and centrifuged. The flour was dried overnight in a vacuum oven. The flour was very white in colour.

The oil was recovered from the solutions of hexane and oil decanted from the above centrifuged solutions using a rotary evaporation. The oil was maintained under vacuum overnight in a vacuum oven. The oil was green in colour and turbid.

The residual oil in the flour and bran fractions was determined using a hot Soxhlet extraction with hexane as the solvent.

The results were as follows:

| | Weight (g) | Percentages of Comminuted Groat | Residual Oil (%) | Protein (%) |
|---|---|---|---|---|
| Comminuted Groat | 242.4 | | | 18.3 |
| Flour | 119.7 | 49.4 | 0.01 | 15.1 |
| Bran | 107.9 | 44.5 | 1.66 | 24.2 |
| Oil | 14.7 | 6.1 | | |

*as measured by total nitrogen × 6.25 on a Kjel-Foss automatic analyzer.

EXAMPLE XII

A 25 g sample of the bran fraction obtained in Example XI was extracted with water at 50° C. for 40 minutes. The solution obtained was then centrifuged. The aqueous solution was decanted from the solids and combined with twice its volume of methanol. The precipitate of crude gum so obtained was centrifuged from the liquid and dried overnight in a vacuum oven. The dried crude gum obtained was 9.5% by weight of the bran.

When the procedure was repeated using the flour fraction of Example XI, the dried crude gum obtained was 0.5% by weight of the flour. Thus in the procedure of Example XII for separating comminuted oats into bran flour and oil fractions, the gum primarily remains with the bran, the flour being substantially free of gum.

EXAMPLE XIII

In order to show that additional flour may be separated from the bran fraction of Example XII, the bran was re-ground using a CASELLA mill having a 0.5 mm circular sieve. 50 g of the re-ground material was admixed with 200 g of hexane, in the form of a slurry, for 15 minutes. The resultant slurry was sieved through a 325 mesh TYLER sieve. The oversize material retained on the sieve was admixed, as a slurry, with a further 200 g of hexane, for 15 minutes and re-sieved. The oversized material (bran) was dried overnight in a vacuum oven. The undersized material in the hexane was centrifuged and the solids (flour) separated and dried overnight in a vacuum oven. The flour obtained was white and the bran was buff coloured.

The results were as follows:

| | Weight (g) | Percentage of Bran Fraction | Protein (%) |
|---|---|---|---|
| Bran Fraction | 50.0 | | 24.2 |
| Flour | 10.0 | 20.0 | 16.3 |
| Bran | 35.6 | 71.2 | 27.3 |

EXAMPLE XIV

A 20 g sample of a flour containing 11.3% protein was admixed, as a slurry, with 80 ml of distilled water. The pH of the slurry was adjusted to 2.0 using dilute hydrochloric acid. The slurry was maintained at ambient temperature for 30 minutes and then centrifuged. The supernatant liquid was decanted off and the solids were re-admixed, as a slurry, with 80 ml of distilled water, the pH of which was then adjusted to 2.0. After 30 minutes the slurry was centrifuged and the supernatant liquid was combined with that previously obtained. The pH of the resultant solution was then adjusted to 4.5 using dilute sodium hydroxide. The precipitate of acid-soluble protein was separated and freeze dried. The solids, referred to below as starch, separated from the first two centrifugations was dried in a vacuum oven.

The above procedure was repeated using an aqueous hydrochloric acid solution at a temperature of 50° C. and using phosphoric acid solutions, instead of the hydrochloric acid solutions, at ambient temperature and at 50° C.

The results were as follows:

| | Run 1 | Run 2 | Run 3 | Run 4 |
|---|---|---|---|---|
| Acid | Hydrochloric | Hydrochloric | Phosphoric | Phosphoric |
| Temperature | ambient | 50° C. | ambient | 50° C. |
| Weight of Flour (g) | 20.0 | 20.0 | 20.0 | 20.0 |
| Acid-Soluble Protein | | | | |
| Weight (g) | 1.3 | 1.4 | 1.8 | 1.8 |
| Protein Content(%) | 99.4 | 99.4 | 93.3 | 94.9 |
| Starch | | | | |
| Weight (g) | 16.8 | 16.8 | 16.7 | 16.9 |
| Protein Content(%) | 1.6 | 1.6 | 1.2 | 2.2 |
| Recovery of Starting Material (flour) (%) | 91 | 91 | 93 | 94 |

Both the acid-soluble protein obtained and the starch obtained were very white in appearance.

To illustrate the solubility of the acid-soluble protein, one gram of the protein from Run 3 was added to 99 g of water, the pH of which was then adjusted to 2.6.

After stirring for 30 minutes the solution was centrifuged to remove any undissolved solids. The supernatant liquid was separated and analyzed for protein. The solution contained 0.93% protein indicating that 99.7% of the protein in the acid-soluble protein had gone into solution.

EXAMPLE XV 40 g of dehulled Hinoat oats that has been comminuted in a commercial-scale hammer mill were agitated, in the form of a slurry, with 160 g of 2-propanol for 15 minutes. The resultant admixture was sieved using a 325 mesh TYLER sieve. The oversize material i.e. that retained on the sieve, was re-admixed, in the form of a slurry, with a further 160 g of 2-propanol for 15 minutes and re-sieved. The oversized material obtained was once again admixed with 160 g of 2-propanol for 15 minutes and re-sieved. The oversized material thus obtained, referred to below as bran, was dried in a vacuum oven overnight. The undersize material, i.e. that passing through the sieve, from all sievings was combined and centrifuged. The solvent was decanted off and the solid material (flour) was dried overnight in a vacuum oven. Oat oil was recovered from the decanted solvent using a rotary evaporator and dried overnight in a vacuum oven.

The flour and bran were analyzed for protein using a Kjel-Foss Automatic Protein Analyzer.
The results were as follows:

| Product | Weight (g) | Percentage of Starting Material | Protein (%) | Colour |
|---|---|---|---|---|
| Flour | 21.85 | 54.6 | 13.5 | white |
| Bran | 11.66 | 29.2 | 21.0 | buff |
| Oil | 3.40 | 8.5 | | yellow |

EXAMPLE XVI

The procedure of Example VIII was repeated using the bran and flour obtained by the procedure of Example XV except that a #2 spindle was used in the viscometer.
The results were as follows:

| Sample | Viscosity (cps) |
|---|---|
| Flour | 15 |
| Bran | * |
| Water** | 6.5 |

*too viscous to measure
**reference, water only.

The above procedure was also repeated using the flour and bran obtained by the procedure of Example X.
The results were as follows:

| Sample | Viscosity (cps) |
|---|---|
| Flour | 27.5 |
| Bran | * |

*too viscous to measure.

EXAMPLE XVII

Dehulled Scott oats, which contained 17.4% by weight of protein, were ground in a CASELLA grain mill having a 1.0 mm circular hole sieve. 50 g of the resultant groat were admixed, as a slurry, with 150 g of hexane for 15 minutes at ambient temperature and then sieved using a 325 mesh TYLER sieve. The oversized material, i.e. that retained on the sieve, was re-admixed with 150 g of hexane, in the form of a slurry, for 15 minutes and then re-sieved. Once again the oversized material obtained was re-admixed with 150 g of hexane for 15 minutes and re-sieved. The buff coloured oversize material thus obtained, which is referred to below as bran, was dried overnight in a vacuum oven.

The undersized material i.e. that passing through the sieve, from each of the sievings was combined and centrifuged. The solution of hexane and oil was decanted off. The solid material from the centrifuge was admixed with 150 g of hexane in the form of a slurry so as to remove adsorbed oil and recentrifuged, the hexane solution again being decanted off. The oil was separated from the hexane from the combined hexane oil solutions using a rotary evaporator and dried overnight in a vacuum oven. The oil was green and turbid.

The solid material from the centrifuge, referred to below as flour, was dried overnight in a vacuum oven. The flour was white in colour.

The flour and bran were analyzed for protein using a Kjel-Foss protein analyzer. The results were as follows:

| | Weight (g) | Protein (%) |
|---|---|---|
| Bran | 17.4 | 25.1 |
| Flour | 25.1 | 17.1 |
| Oil | 2.7 | |

The embodiments of the invention in which an exclusive property or privilege is claimed are defined as follows:

1. A process for the separation of a substantially gum-free flour from oats, said process comprising:
   (a) admixing comminuted dehulled oats with an organic solvent capable of extracting oil from said oats for a time sufficient to substantially de-oil said oats, said solvent being selected from the group consisting of pentane, hexane, heptane, cyclohexane, and alcohols of 1-4 carbon atoms, and mixtures thereof; and
   (b) separating the admixture of comminuted oats and solvent into at least two fractions, one fraction having bran as a substantial part of the solid component and a second fraction having substantially gum-free flour as the major solid component, the amount of flour separated from the admixture being at least 20% by weight of the comminuted oats, said admixture being separated by agitating the admixture under mixing conditions adjusted to cause a nonuniform distribution of the fractions of the comminuted oats in the solvent thereby causing the fractions to settle at different rates, whereby separation of the fractions is effected.

2. The process of claim 1 in which the second fraction is flour which is substantially free of bran.

3. The process of claim 2 in which one or more of bran, gum-free flour and oat oil are separately recovered in an essentially solvent-free form.

4. The process of claim 2 in which the step of agitating said comminuted oats and solvent includes cessation of mixing followed immediately by separation of the admixture into fractions.

5. The process of claim 2 in which solvent is continuously added to the agitated mixture and the second fraction is continuously separated from the mixture.

6. The process of claim 5 in which the comminuted oats are obtained from dehulled oats using a pin-mill, a hammer-mill or corrugated rollers.

7. The process of claim 1 in which bran is recovered and in which the bran is subjected to further comminution, readmixed with solvent and a further separation of the resulting admixture into fractions having a bran as a substantial solid component and having gum-free flour as the major solid component is carried out.

8. A process for the separation of a substantially gum-free flour from oats, said process comprising:
   (a) admixing comminuted dehulled oats with an organic solvent capable of extracting oil from said oats for a time sufficient to substantially de-oil said oats, said solvent being selected from the group consisting of pentane, hexane, heptane, cyclohexane, and alcohols of 1–4 carbon atoms, and mixtures thereof; and
   (b) separating the admixture of comminuted oats and solvent into at least two fractions, one fraction having bran as a substantial part of the solid component and a second fraction having substantially gum-free flour as the major solid component, the amount of flour separated from the admixture being at least 20% by weight of the comminuted oats, said admixture being separated by sieving the admixture through a sieve capable of retaining substantially all of the bran on the mesh of the sieve and capable of passing solvent containing said gum-free flour, whereby separation of the fractions is effected.

9. The process of claim 8 in which the solvent is selected from the group consisting of pentane, hexane, heptane, and cyclohexane, and mixtures thereof.

10. The process of claim 9 in which the comminuted groats are obtained by using a pin-mill, a hammer mill or corrugated rollers.

11. The process of claim 8 in which the second fraction is flour which is substantially free of bran.

12. The process of claim 11 in which the solvent is hexane.

13. The process of claim 11 in which bran is recovered and in which the bran is subjected to further comminution, readmixed with solvent and a further separation into fractions having a bran as a substantial solid component and having gum-free flour as the major solid component is carried out.

* * * * *